(12) United States Patent
Tatzel et al.

(10) Patent No.: US 10,295,837 B2
(45) Date of Patent: May 21, 2019

(54) VARIABLE TRANSMISSION WINDOW WITH BLACKOUT BARS

(71) Applicant: VG SMARTGLASS, LLC, Chicago, IL (US)

(72) Inventors: Ryan Tatzel, Syosset, NY (US); Michael Stacey, Chicago, IL (US); Abhiroop Chattopadhyay, Chicago, IL (US)

(73) Assignee: VG SMARTGLASS, LLC, Jupiter, FL (US)

( * ) Notice: Subject to any disclaimer, the term of this patent is extended or adjusted under 35 U.S.C. 154(b) by 221 days.

(21) Appl. No.: 15/356,942

(22) Filed: Nov. 21, 2016

(65) Prior Publication Data

US 2017/0146808 A1 May 25, 2017

Related U.S. Application Data

(60) Provisional application No. 62/258,670, filed on Nov. 23, 2015.

(51) Int. Cl.
*G02B 5/30* (2006.01)
*B29D 11/00* (2006.01)
(Continued)

(52) U.S. Cl.
CPC ........ *G02B 27/281* (2013.01); *B29D 11/0073* (2013.01); *B29D 11/00644* (2013.01);
(Continued)

(58) Field of Classification Search
CPC .......... B29D 11/00644; B29D 11/0073; G02B 5/3083; G02B 26/023; G02B 26/02;
(Continued)

(56) References Cited

U.S. PATENT DOCUMENTS 2,260,220 A 10/1941 Grabau
2,280,358 A 4/1942 Tietig
(Continued)

FOREIGN PATENT DOCUMENTS

EP 0 182 639 A2 11/1985
WO WO8706355 A1 10/1987
(Continued)

OTHER PUBLICATIONS

Search Report under Section 17(5), from the Great Britain Intellectual Property Office for GB Patent Application No. GB1619646.1, dated May 8, 2017, 5 pages.
(Continued)

*Primary Examiner* — Stephone B Allen
*Assistant Examiner* — Adam W Booher
(74) *Attorney, Agent, or Firm* — The Marbury Law Group PLLC

(57) ABSTRACT

A variable transmission window includes a patterned first polarizer and an opposing patterned second polarizer. The first polarizer includes an optically transmissive first substrate; alternating first and second domains attached to the first substrate, the first domains having a polarization axis that is perpendicular to a polarization axis of the second domains; and blackout bars configured to block visible light, each blackout bar overlapping opposing edge regions of adjacent corresponding first and second domains. The second polarizer includes an optically transmissive second substrate; and alternating third and fourth domains attached to the second substrate, the third domains having a polarization axis that is perpendicular to a polarization axis of the fourth domains. The second polarizer may also include blackout bars overlapping opposing edge regions of adjacent corresponding third and fourth domains.

8 Claims, 8 Drawing Sheets

(51) Int. Cl.
  *G02B 26/02* (2006.01)
  *G02B 27/28* (2006.01)
(52) U.S. Cl.
  CPC ......... *G02B 5/3083* (2013.01); *G02B 26/023* (2013.01); *B29K 2995/0018* (2013.01)
(58) Field of Classification Search
  CPC .......... G02B 27/281; B29K 2995/0018; B32B 17/10458; B32B 17/10467
  See application file for complete search history.

(56) References Cited

U.S. PATENT DOCUMENTS

| | | | |
|---|---|---|---|
| 2,281,112 A | 4/1942 | Ryan | |
| 2,302,507 A | 11/1942 | Ryan | |
| 2,617,329 A | 11/1952 | Dreyer | |
| 3,159,844 A | 12/1964 | Haboush | |
| 3,443,855 A | 5/1969 | Land et al. | |
| 3,504,962 A | 4/1970 | Shanley | |
| 3,521,300 A | 7/1970 | Weiss | |
| 3,528,722 A | 9/1970 | Makas | |
| 3,540,793 A | 11/1970 | Araujo et al. | |
| 3,663,089 A | 5/1972 | Makas | |
| 3,880,496 A | 4/1975 | Davidyan et al. | |
| 4,070,096 A | 1/1978 | Jasgur | |
| 4,123,141 A | 10/1978 | Schuler | |
| 4,153,952 A | 5/1979 | Dussich | |
| 4,285,577 A | 8/1981 | Schuler | |
| 4,364,375 A | 12/1982 | Younghouse | |
| 4,509,825 A | 4/1985 | Otto et al. | |
| 4,512,638 A | 4/1985 | Sriram et al. | |
| 4,579,426 A | 4/1986 | Onufry | |
| 4,719,720 A | 1/1988 | Olsen | |
| 4,773,733 A | 9/1988 | Murphy, Jr. et al. | |
| 4,902,112 A | 2/1990 | Lowe | |
| 4,962,780 A | 10/1990 | Engdahl et al. | |
| 5,033,829 A | 7/1991 | Faroughy | |
| 5,164,856 A | 11/1992 | Zhang et al. | |
| 5,189,552 A | 2/1993 | Metwalli | |
| 5,686,979 A | 11/1997 | Weber et al. | |
| 5,841,581 A | 11/1998 | Tutt | |
| 5,940,216 A | 8/1999 | Gibbs | |
| 5,999,316 A | 12/1999 | Allen et al. | |
| 2,046,849 A | 4/2000 | Moseley et al. | |
| 6,046,849 A | 4/2000 | Moseley et al. | |
| 6,185,039 B1 | 2/2001 | Allen et al. | |
| 6,368,760 B1 | 4/2002 | Nishiquchi | |
| 6,414,790 B1 | 7/2002 | Bennett | |
| 6,452,724 B1 | 9/2002 | Hansen | |
| 6,710,921 B2 | 3/2004 | Hansen et al. | |
| 6,878,425 B1 | 4/2005 | Gomes | |
| 7,113,335 B2 | 9/2006 | Sales | |
| 7,375,887 B2 | 5/2008 | Hansen et al. | |
| 7,548,370 B2 | 6/2009 | Albert et al. | |
| 7,630,132 B2 | 12/2009 | Sangu et al. | |
| 8,310,757 B2 | 11/2012 | McLeod et al. | |
| 8,508,681 B2 | 8/2013 | Tatzel et al. | |
| 2001/0040730 A1 | 11/2001 | Lee et al. | |
| 2003/0142400 A1 | 7/2003 | Hansen et al. | |
| 2004/0120041 A1 | 6/2004 | Silverstein et al. | |
| 2004/0263670 A1* | 12/2004 | Yamasaki | G06F 3/0412 348/340 |
| 2006/0061862 A1 | 3/2006 | Mi et al. | |
| 2006/0193046 A1 | 8/2006 | Yellin | |
| 2006/0215263 A1 | 9/2006 | Mi et al. | |
| 2006/0238867 A1 | 10/2006 | Takeda et al. | |
| 2006/0262398 A1 | 11/2006 | Sangu et al. | |
| 2009/0190217 A1 | 7/2009 | Chen et al. | |
| 2010/0053751 A1 | 3/2010 | McLeod et al. | |
| 2012/0026305 A1* | 2/2012 | Kim | H04N 13/337 348/58 |
| 2012/0169950 A1 | 7/2012 | Tatzel et al. | |
| 2015/0205142 A1* | 7/2015 | Kim | G02B 27/26 349/15 |

FOREIGN PATENT DOCUMENTS

| | | |
|---|---|---|
| WO | WO2006090396 A1 | 8/2006 |
| WO | WO2010078066 A1 | 7/2010 |

OTHER PUBLICATIONS

"Intastop," Oct. 5, 2015, IVision—Revolutionary Vision Panel from Instastop, Youtube.com, [Online], Available from: https://www.youtube.com/watch?v=vCvSVba44XA [Accessed Apr. 19, 2017]—Please note the silver-coloured blackout bars at the edges of the striped regions on both panels (particularly at 00:35-00:40).

Chen et al., "Large Flexible Nanowire Grid Visible Polarizer Mad by Nanoimprint Lithograph," Applied Physics Letters, vol. 90, N6, Feb. 8, 2007, pp. 063111-1 to 063111-3.

Ahn et al., "Fabrication of a 50nm half-pitch Wire Grid Polarizer Using Nanoprint Lithography," 2005 Nanotechnology, vol. 16, N9, Jul. 22, 2005, pp. 1874-1877.

International Search Report from Korean Intellectual Property Office for PCT/US2013/022453, dated Jun. 21, 2013.

International Search Report & Written Opinion issued in PCT Application No. PCT/US2011/067754, dated Jul. 2 2012.

* cited by examiner

VARIABLE TRANSMISSION WINDOW WITH BLACKOUT BARS

CROSS-REFERENCE TO RELATED APPLICATIONS

This application claims the benefit of priority to U.S. Provisional Patent Application Ser. No. 62/258,670 filed Nov. 23, 2015, which is hereby incorporated herein by reference in its entirety.

BACKGROUND

A polarizer is a device that transforms unpolarized or mixed polarization electromagnetic waves into polarized waves. Polarizers have found a wide array of practical applications such as in photographic filters, microscopes, optoelectronics, lasers, and liquid crystal displays. Wave plates or retarders are optical devices that can change the polarization of electromagnetic waves. Wave plates are often used to control the polarization of waves and therefore are involved in many of the same applications as polarizers. Many prior art devices rotate polarizers or wave plates relative to one another to vary the angle between polarization or optic axes. For example, polarization filters for photography may involve rotating a polarizer to vary the intensity of light transmission through the filter.

When two linear polarizers are disposed facing one another, the second polarizer is generally called an analyzer. When the polarization axis of the polarizer and analyzer are parallel, the amount of light transmittance is maximized. If the two axes are orthogonal the polarizers are crossed, in theory, no light is transmitted. Furthermore, rotation of one polarizer with respect to the other will result in partial light blockage over the range of transmittances between a minimum and maximum transmittance.

Thus, the rotation of one polarizer with respect to another or rotation of a wave plate placed between two crossed polarizers will result in a variation of light transmittance. Unfortunately, most applications for controlled partial light transmittance do not conveniently allow for rotation of an optical element. Thus, there is a widely recognized need for a device that uses polarizers to control light transmittance amounts and that does not require rotation of a polarizer.

SUMMARY OF THE INVENTION

According to various embodiments, provided is a variable transmission window including: a patterned first polarizer and an opposing patterned second polarizer. The first polarizer includes: an optically transmissive first substrate; alternating first and second domains attached to the first substrate, the first domains having a polarization axis that is perpendicular to a polarization axis of the second domains; and blackout bars configured to block visible light, each blackout bar overlapping opposing edge regions of adjacent corresponding first and second domains. The second polarizer includes: an optically transmissive second substrate; and alternating third and fourth domains attached to the second substrate, the third domains having a polarization axis that is perpendicular to a polarization axis of the fourth domains. The second polarizer may also include blackout bars overlapping opposing edge regions of adjacent corresponding third and fourth domains.

According to various embodiments, provided is a method of manufacturing a patterned polarizer, the method including: providing a roll of polarizer material having a uniform polarization axis; cutting the polarizer material in a first direction to form first polarizer strips; cutting the polarizer material in a second direction perpendicular to the first direction, to form second polarizer strips; alternately attaching the first and second polarizer strips to an optically transmissive substrate; and overlapping gaps between the first and second polarizer strips with blackout bars configured to prevent light leakage through the gaps.

According to various embodiments, provided is a method of manufacturing a patterned polarizer, the method including: providing a roll of polarizer material having a uniform polarization axis; cutting the polarizer material in a first direction to form polarizer strips having a first surface, an opposing second surface, and polarization axis of 45°; attaching the polarizer strips to an optically transmissive substrate, such that the first surface of every other polarizer strip faces the substrate and the second surface of the remaining polarizer strips faces the substrate; and overlapping gaps between the polarizer strips with blackout bars configured to prevent light leakage through the gaps.

According to various embodiments, provided is a variable transmission window, comprising: a patterned first wave retarder comprising: an optically transmissive first substrate; alternating first and second domains attached to the first substrate, the first domains having an optical axis that is perpendicular to an optical axis of the second domains; and blackout bars configured to block visible light, each blackout bar overlapping opposing edge regions of adjacent corresponding first and second domains; and a patterned second wave retarder facing the first polarizer and comprising: an optically transmissive second substrate; and alternating third and fourth domains attached to the second substrate, the third domains having an optical axis that is perpendicular to an optical axis of the fourth domains.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION OF THE PREFERRED EMBODIMENTS

Figure 1A:
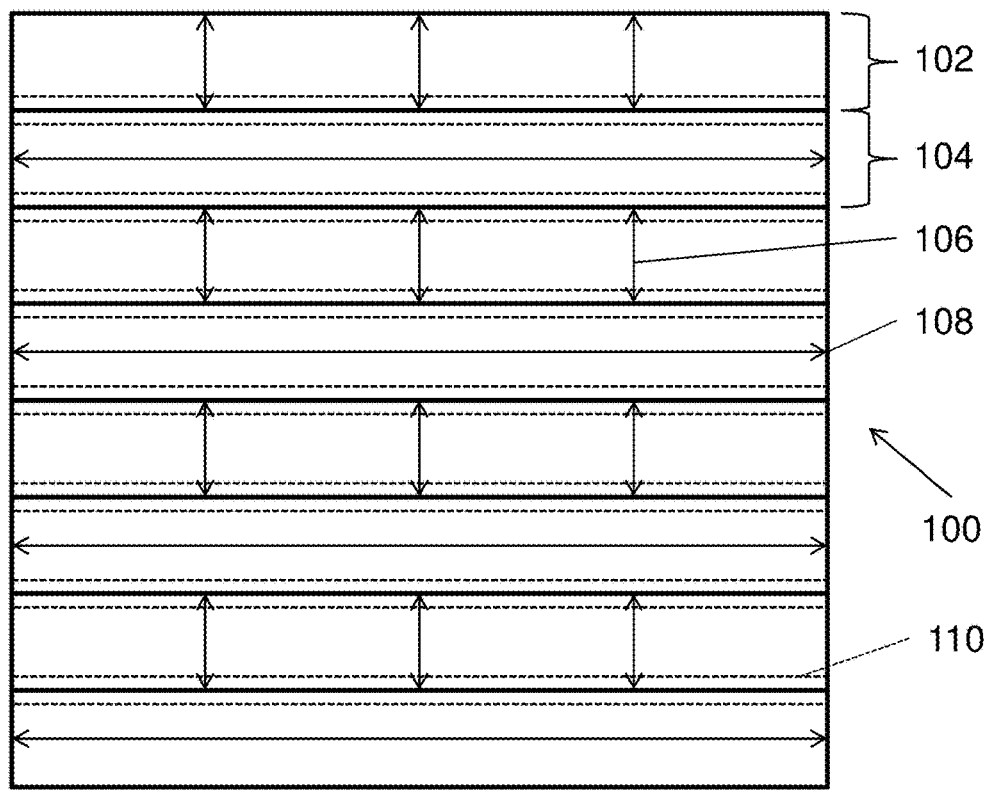
FIG. 1A is a top view of a patterned polarizer for a variable transmission window, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments include variable light transmission devices configured to provide continuous or nearly continuous variations in light transmission. Alternatively, the devices may switch between discreet states, such as an "on" transmissive state and a lower transmission "off" or dark state where the light transmission is below 5%, such as 1% or less. These devices may be used in many different applications, such as windows or shades in buildings, vehicles, or any other place where regulating light, glare, or heat would be useful. Various embodiments take advantage of polarization and wave retarder theory. For example, embodiments may include two or more uniform or patterned light polarizers or wave retarders configured to be linearly translated with respect to each other. Further embodiments may include uniform or patterned polarizers or wave retarders manufactured by any of the various methods disclosed herein. As used herein, the term "light" includes visible radiation (e.g., visible portion of the solar spectrum) as well as infra-red and/or ultra violet radiation (e.g., IR and UV portions of the solar spectrum).

Polarization Theory

An electromagnetic wave includes electric and magnetic field components which oscillate perpendicular to each other and to the direction of wave propagation. A beam of light may be described by its direction of propagation, frequency, and vector amplitude (e.g., electric field vector). The vector amplitude is related to the intensity of the beam and is perpendicular to the wave's direction of travel. Given a direction of wave propagation (e.g., z-axis), there are two independent mutually orthogonal transverse components, the ordinary ray and extraordinary ray (e.g., $E_x$ and $E_y$), of the electric field vector amplitude.

The plane containing the electric field vector and the direction of propagation is called the plane of polarization. Polarization is a property of waves that describes the orientation of their oscillations.

In unpolarized light, the electric field vectors are randomly oriented about the direction of propagation. Conversely, if the electric field vectors are oriented in the same direction for all waves, the light is regarded as plane polarized. A polarizer is an optical arrangement which produces a beam of polarized light from a beam of unpolarized light. Given a direction of propagation (e.g., z-axis), a polarizer decomposes the electric field vector of a beam of unpolarized light into two independent mutually orthogonal transverse components, the ordinary ray and extraordinary ray, (e.g., $E_x$ and $E_y$) and preferentially selects one and rejects the other. Depending on the type of polarizer this selection is accomplished by absorption, reflection, refraction, or scattering.

Malus' law gives the intensity (I) produced when a polarizer is placed in front of an incident beam.

$$I = I_0 \cos^2 \theta_i$$

where $I_0$ is the initial intensity and $\theta_i$ is the angle between the lights initial polarization direction and the axis of the polarizer.

A beam of unpolarized light can be thought of as containing a uniform mixture of linear polarizations at all possible angles. Since the integral over a full cycle of $\cos^2 \theta$ is ½, the intensity of light transmitted through a single polarizer is 50% of the initial intensity. In practice, some light is typically lost in the polarizer and the actual transmission of unpolarized light may be somewhat lower than this.

When two linear polarizers are placed one after another, the mutual angle between their polarizing axes gives the value of θ in Malus' law. The second polarizer is generally referred to as an analyzer. Therefore, when the polarization axes of the polarizer and analyzer are parallel the amount of light transmittance is maximized, and if the two axes are orthogonal the polarizers are crossed and in theory no light is transmitted. Furthermore, rotation of one polarizer with respect to the other will result in partial light blockage over the range of transmittances between that minimum and maximum in accordance with Malus' law.

Wave Retarder Theory

Another useful tool for manipulating the polarization of light is a wave retarder, also known as a wave plate. A wave plate or retarder is a birefringent material that alters the polarization state of a wave travelling through it (i.e., reorienting the polarization axis of the wave).

Birefringence, or double refraction, is the splitting of a beam of unpolarized light into two rays. Most optical materials are isotropic, i.e. having the same optical properties (and therefore one index of refraction) regardless of the direction of propagation through the material. In anisotropic materials either the separation between neighboring atomic structural units is different in different directions or the bonds tying such units together have different characteristics in different directions. As a result the velocity of a wave is a function of a displacement direction. Polarized light propagating through such materials will experience a different index of refraction for different directions of propagation and polarization orientations. This phenomenon is known as birefringence. Within the material there exists an optic axis with a unique optical property such that light propagating along it encounters only one index of refraction regardless of its polarization direction. Birefringent materials are either uniaxial or biaxial, depending upon whether they have one optic axis or two. Although uniaxial materials are discussed in the example embodiments below for the sake of simplicity, various embodiments may include birefringent materials with two or more optic axes.

For each propagation direction with linearly polarized electromagnetic waves, there are two principal displacement directions for which the velocity is different. These polarization directions are at right angles. When the plane of polarization of a light beam does not coincide with one of the two principal displacement directions, the light vector will be split into two components corresponding to the two directions. The ordinary ray is always polarized with its electric field vector perpendicular to the optic axis and encountering the ordinary refractive index ($n_o$) travels with the same speed in all directions obeying Snell's law of refraction. The extraordinary wave is always polarized with its electric field vector parallel to the alignment axis, encounters the extraordinary refractive index ($n_e$), does not propagate perpendicularly to its wavefronts, and in general does not obey Snell's law. The separation between the two rays depends upon the direction in which the light travels through the crystal relative to that of the optic axis of the crystal. Quantitatively, the birefringence value of a material is defined as ($n_e-n_o$).

If $n_e>n_o$ the velocity of propagation of the extraordinary wave is greater than that of the ordinary wave and birefringent material is said to be positive. The birefringent material is said to be negative if the reverse is true. Often the axis which propagates with the highest index value is called the slow axis.

Simply stated, a birefringent material resolves light into two components by causing one type of vibration to travel one path and the other type to travel another path at different velocities. Consequently the components emerge from the birefringent material differing in phase and the polarization state of the incident light is changed.

The resulting phase difference or retardance ($\Gamma$) for extraordinary and ordinary rays is given by the equation $$\Gamma = 2\pi d(n_e-n_o)/\lambda$$

where d indicates the material thickness, $\lambda$ the wavelength, and $n_e$ and $n_o$ are the refraction indices of extraordinary and ordinary rays, respectively.

As discussed previously light does not transmit when the polarization axis of the polarizer and the polarization axis of the analyzer are orthogonal. However, inserting a wave plate between a polarizer and an analyzer changes the state of the polarized light and may cause the light to pass through. When the optic axis of a wave plate is placed between crossed polarizers at an angle of $\theta$ to the input polarizer's axis, the intensity of the injected light is expressed as $$I = I_0 \sin^2 2\theta \sin^2(\Gamma/2)$$

Therefore the amount of light transmitted is determined by both (1) the angle between the optic axis of the incoming polarizer and the optic axis of the wave plate and (2) the retardance. Moreover, the retardance is determined by the thickness of the birefringent material and the birefringence of the wave plate ($n_e-n_o$).

If the retardation corresponds to $\pi$ radians (or 180°), then it is called a half-wave plate. A retardation of $\Gamma=\pi$ will cause the polarization to rotate to twice the angle of the half wave plate's fast axis with the input polarization plane. The amount of light transmitted is determined by the angle between the optic axis of the incoming polarizer and half wave plate. Placing the half wave plate's optic axis at 45° to the incoming polarizer achieves a maximum transmission. Aligning the optic axis of the half wave plate with either of the input or output polarizers optic axes gives the minimum transmission. Furthermore, rotation of the optic axis of the half wave plate results in partial light blockage over the range of transmittances between that minimum and maximum in accordance with Malus's law.

Various embodiments may also include quarter-wave plates. Quarter-wave plates have a retardation of $\pi/2$ radians (or 90°) or quarter-wavelength phase shift and can change linearly polarized light into circularly polarized and back again.

It is also possible to vary the light transmission by adjusting the retardance. By aligning the fast axis of the variable retarder at a predetermined angle, such as at 45° or another suitable angle relative to the input polarizer, and modulating the retardance between half wave and full wave, transmission varies between maximum and minimum. This variation in retardance can be achieved by varying the thickness of the birefringent material or the birefringence of the film ($n_e-n_o$).

Variable Transmission Windows

The various embodiments include variable transmission windows adjustable through linearly translating a patterned polarizer or a patterned wave plate. The patterned polarizer or wave plate may move relative to another patterned polarizer or wave plate. In some embodiments, polarizers and wave plates may be joined together in panels to move together relative to other polarizers or wave plates. For example, some embodiments may include a first panel with a first uniform linear polarizer and a first wave plate physically coupled together that may linearly translate relative to a second panel with a second uniform linear polarizer physically coupled with a second wave plate. Alternatively, one or both wave plates may be unconnected to panels or polarizers and/or omitted.

Embodiments may include various types of polarizers. Some embodiments may incorporate uniform polarizers with a single uniform polarization axis. These polarizers may include iodine dyed polarizers, wire grid polarizers, coatable polarizers, reflective polarizers, or various absorptive polarizers. Alternate embodiments may include patterned polarizers with multiple polarization axes. For these embodiments with patterned polarizers, the wave retarders are not required.

Figure 1B:
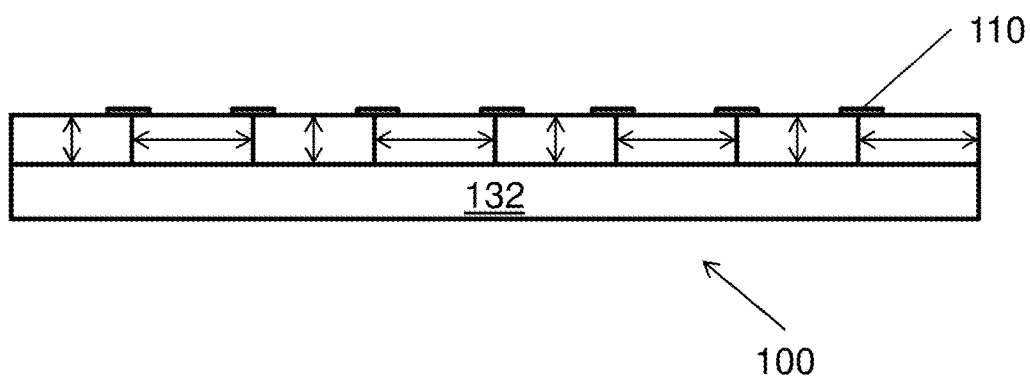
FIG. 1B is a side view of the polarizer of FIG. 1A.

FIG. 1A is a top view of a patterned polarizer 100 for a variable transmission window, according to various embodiments of the present disclosure. FIG. 1B is a side view of the polarizer 100.

Referring to FIGS. 1A and 1B, the polarizer 100 may be divided into domains having different polarization axes. The polarization axis may be uniform within each domain but vary between adjacent domains. For example, the polarizer 100 may include first domains 102 having a first polarization axis 106 and second domains 104 having second polarization axis 108. The first and second polarization axes 106, 108 may be perpendicular to one another, in some embodiments. For example, as shown in FIGS. 1A and 1B, the first polarization axes 106 may be oriented vertically, and the second polarization axes 108 may be oriented horizontally. However, the present disclosure is not limited to any particular axis orientation.

While eight total domains are shown in FIGS. 1A and 1B, the polarizer 100 is not limited to any particular number of domains. In addition, while the polarizer 100 is shown to include two different domains (e.g., the first and second domains 106, 108), the polarizer 100 may include three, four, five, six, seven, eight, etc., different domains that each have a different polarization axes, with the domains being aligned on the polarizer 100 in a repeating pattern, such that the orientation of the polarization axes of adjacent domains varies by a set amount. For example, the polarization axes of adjacent domains may vary by an angular amount equal to 180°/(the number of different domains). In other words, for a polarizer including a repeating pattern of sixth different domains, adjacent domains may vary in optical axis by 30°. Further, while linear polarization is described herein for simplicity, in some embodiments, circular polarization may be used. Each domain may be strip shaped and may be 20-100 mm, such as from around 25-76 mm wide, in some embodiments, but this width may vary.

The polarizer 100 may include visible light blocking blackout bars 110 disposed on a surface thereof. The blackout bars 110 may be formed of an opaque or substantially opaque material, such as a black polymer material or ink. For example, the blackout bars 110 may have a visible light transmission amount of 2% or less, such as 0 to 2%, or 0.01 to 0.1%. Each blackout bar 110 may be disposed so as to overlap opposing edges of adjacent domains. The operation of the blackout bars 110 will be discussed in further detail below. In some embodiments, the polarizer 100 may optionally include a substrate 132, such as a light transmissive substrate or a polarizing substrate.

In practice, the patterned polarizer 100 may be created by patterning an absorptive/reflective polarization film. Accordingly, adjacent domains may directly interface one another. In other embodiments, the polarizer 100 may be formed by affixing a patterned optical retarder to the substrate 132, and the substrate 132 may operate as a uniform linear polarizer.

Figure 2A:
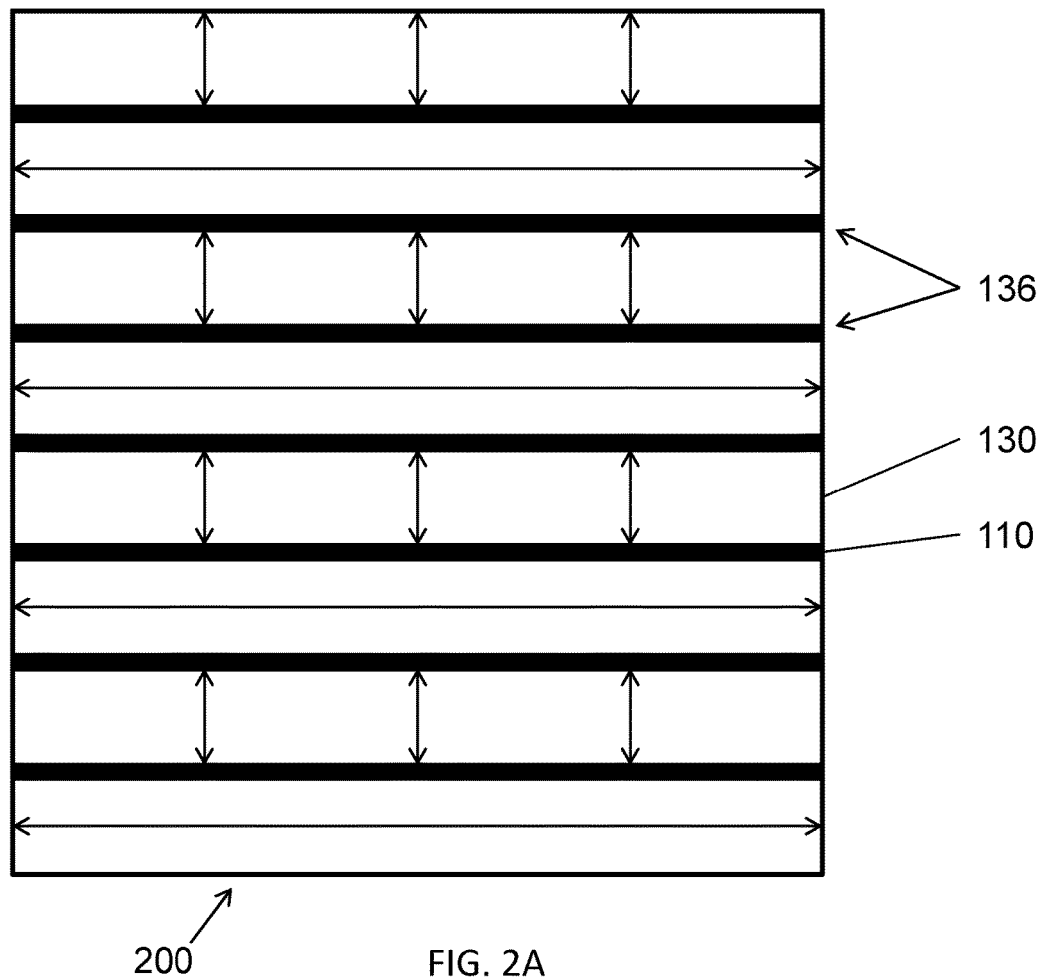
FIG. 2A is a top view of a patterned polarizer for a variable transmission window, according to various embodiments of the present disclosure.
Figure 2B:
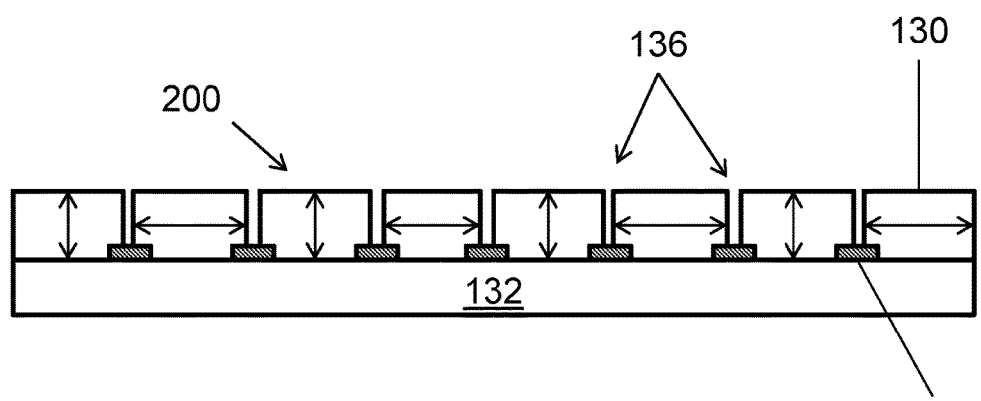
FIG. 2B is a side view of the polarizer of FIG. 2A.

FIG. 2A is a top view of a patterned polarizer 200 for a variable transmission window, according to various embodiments of the present disclosure. FIG. 2B is a side view of the polarizer 200. Referring to FIGS. 2A and 2B, the polarizer 200 includes domains similar to the polarizer 100. However, the domains of the polarizer 200 may be formed by attaching polarizer strips 130 to a light transmissive substrate 132, such as a glass substrate or polymer substrate, such as an acrylic substrate or the like.

As discussed in detail below, the polarizer 200 may include gaps 136 between the strips 130, and visible light blocking blackout bars 110 that overlap the gaps 136. In particular, each blackout bar 110 may completely overlap with a corresponding gap 136, and may also overlap with opposing edge regions of adjacent strips 130. In other words, the blackout bars 110 may be wider than the gaps 136.

As shown in FIG. 2B, the blackout bars 110 may be formed on the substrate 132 prior to attaching the strips 130, according to various embodiments. For example, the blackout bars 110 may be formed from an ink printed directly on the substrate 132. In other embodiments, the blackout bars 110 may be formed by attaching strips of a light-blocking film, such as an opaque or substantially opaque polymer film or the like, directly onto the substrate 132.

Figure 2C:
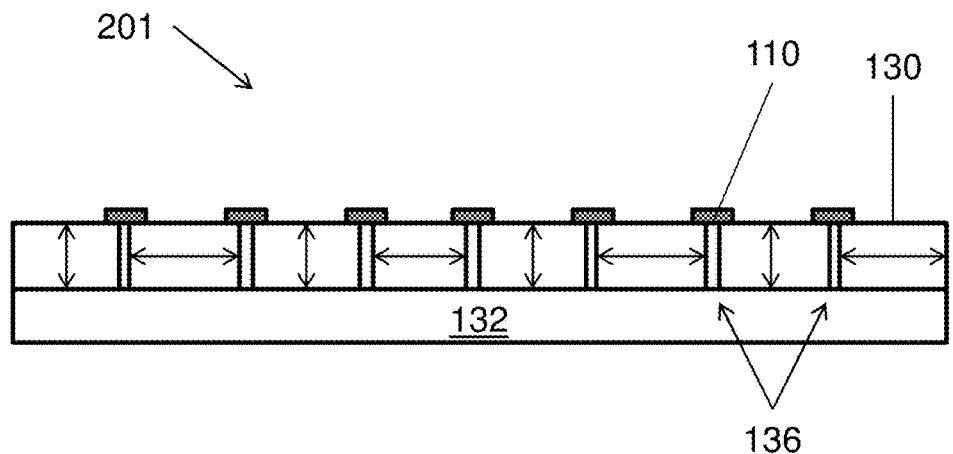
FIG. 2C is a side view of a patterned polarizer according to various embodiments of the present disclosure.

FIG. 2C is a side view of a patterned polarizer 201 according to various embodiments of the present disclosure. The polarizer 201 is similar to the polarizer 200, so only the differences therebetween will be discussed in detail. Referring to FIG. 2C, the polarizer includes blackout bars 110 that overlap gaps 136 between adjacent polarizer strips 130. Unlike the polarizer 200, the blackout bars 110 of the polarizer 201 are disposed on outer surfaces of the strips 130, rather than between the substrate 132 and the strips 130 (e.g., directly on the substrate 132). The blackout bars 110 may be formed from polymer strips that are applied to the outer surfaces of the strips 130, after inner surfaces of the strips 130 have been laminated to the substrate 132. In some embodiments, the blackout bars 110 may be formed of vinyl strips or a similar opaque or substantially opaque polymer material.

According to various embodiments, the strips 130 may be formed by cutting a polarization film sheet, as discussed in detail below. As such, the dimensions of the strips 130 may vary. Further, it may also be practically difficult to insure that the strips 130 are aligned on the substrate 132 with no space or gaps 136 therebetween.

Figure 3A:
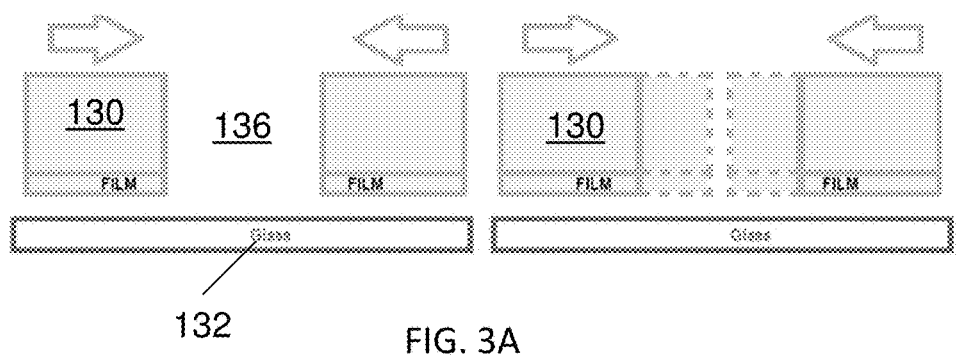
FIG. 3A is a partial perspective view showing thermal expansion of polarizer strips, according to various embodiments of the present disclosure.

FIG. 3A is a partial perspective view showing thermal expansion of the strips 130. As shown in FIG. 3A, temperature changes may result in expansion and contraction of the strips 130. The gaps 136 allow for such dimensional changes to occur without adjacent strips 130 contacting one another.

Figure 3B:
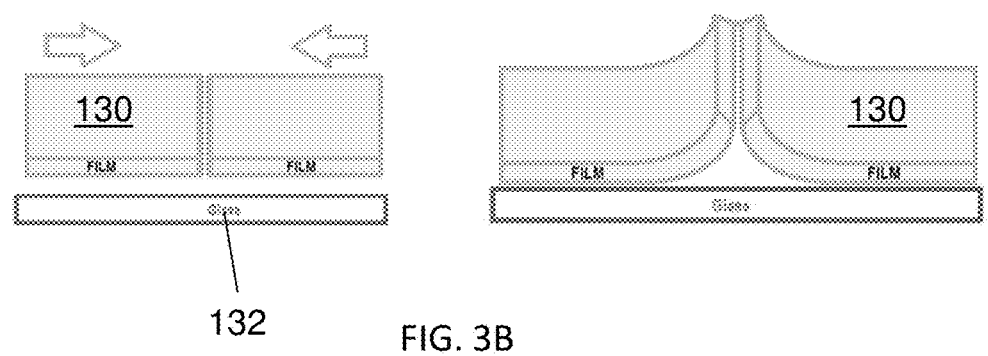
FIG. 3B is a partial perspective view showing thermal expansion of the polarizer strips of a comparative embodiment.

FIG. 3B is a partial perspective view showing thermal expansion of the strips 130 of a comparative embodiment, where substantially no gap is disposed therebetween. As shown in FIG. 3B, if there is no or an insufficient gap between strips 130, then adjacent strips 130 may contact one another during expansion. As a result, the strips 130 may become detached from the substrate 132.

Figure 4A:
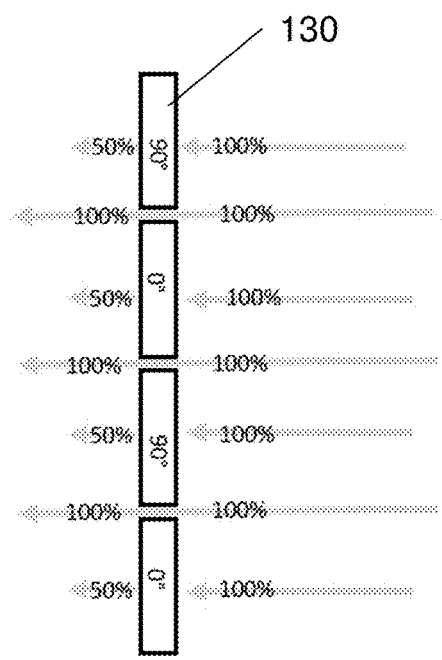
FIG. 4A is a side view showing light transmission through polarizer strips and gaps of a comparative patterned polarizer that lacks blackout bars.
Figure 4B:
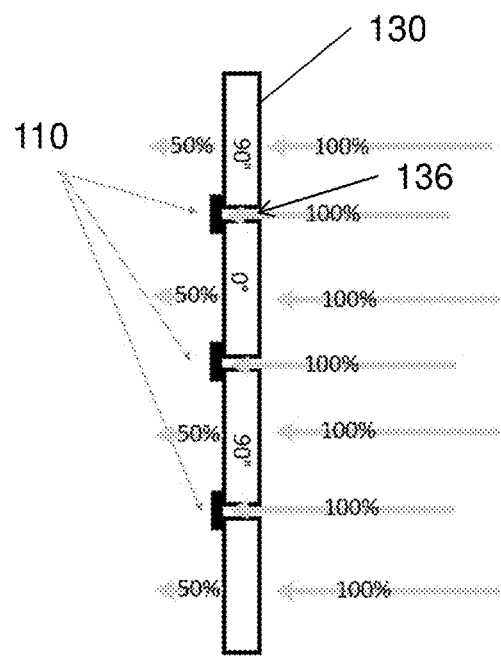
FIG. 4B is a side view showing light transmission through polarizer strips and gaps of a patterned polarizer that includes blackout bars, according to various embodiments of the present disclosure.

FIG. 4A is a side view showing light transmission through strips 130 and gaps 136 of a comparative polarizer that lacks blackout bars. FIG. 4B is a side view showing light transmission through strips 130 and gaps 136 of a polarizer that includes blackout bars 110, according to various embodiments of the present disclosure.

Referring to FIG. 4A, the gaps 136 may allow for a significant amount of light leakage through the comparative polarizer. For example, the intensity of light passing through the strips 130 may be reduced by about 50%, while the intensity of light transmitted through the gaps 136 may remain unchanged. Therefore, the aesthetic appeal of a window including the comparative polarizer may be reduced, and the dark state of such a window may be insufficiently dark to provide privacy.

As shown in FIG. 4B, the blackout bars 110 prevent light from passing through the gaps 136. Accordingly, the above problems may be prevented by the blackout bars 110.

Figure 4C:
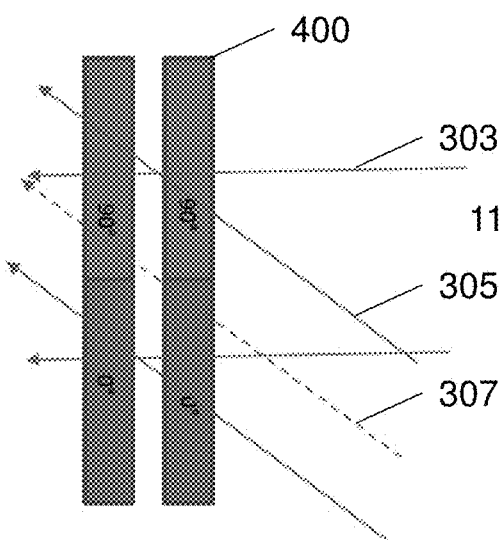
FIG. 4C is a side view showing light transmission through two adjacent comparative patterned polarizers, as arranged in a two state variable transmission window.
Figure 4D:
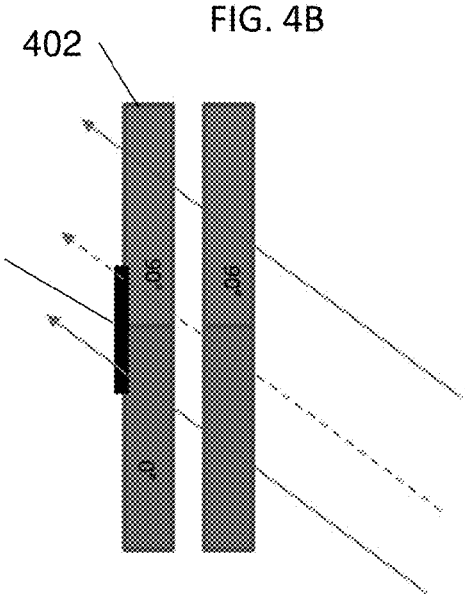
FIG. 4D is a side view showing light transmission through the two adjacent patterned polarizers, with one of the polarizers including a blackout bar, according to various embodiments of the present disclosure.

FIG. 4C is a side view showing light transmission through two adjacent comparative patterned polarizers 400, as arranged in a two state variable transmission window. FIG. 4D is a side view showing light transmission through the two adjacent patterned polarizers 402, with one of the polarizers 402 including a blackout bar 110, according to various embodiments of the present disclosure.

Referring to FIG. 4C, the patterned polarizers 400 include adjacent domains having polarization axes of 0° and 90°. This configuration is very susceptible to parallax. Parallax is a displacement or difference in the apparent position of an object viewed along two different lines of sight. For a variable transmission window, the light transmission state is determined by the alignment of the domains in the two panels. However, the apparent alignment changes depending upon the viewing angle.

In FIG. 4C, the two polarizers 400 are aligned to produce a bright state, such that when viewed along a line 303 normal to the polarizers 400. However, when viewed at a different angle, portions of the window will appear to be in a dark or transition state, while other portions will appear to be in the bright state. For example, a portion of the window viewed along line 305 will appear in the bright state. However, a portion of the window viewed along line 307 will appear in a dark or transition state, since light transmitted along line 307 passes through domains that have different polarization axes. This effect is increase as the gap between the polarizers is increased.

In FIG. 4D, the blackout bar 110 blocks light that is transmitted at an angle through domains having two different polarization axes. Accordingly, the blackout bar 110 reduces the parallax problem to only extreme viewing angles.

Figure 5:
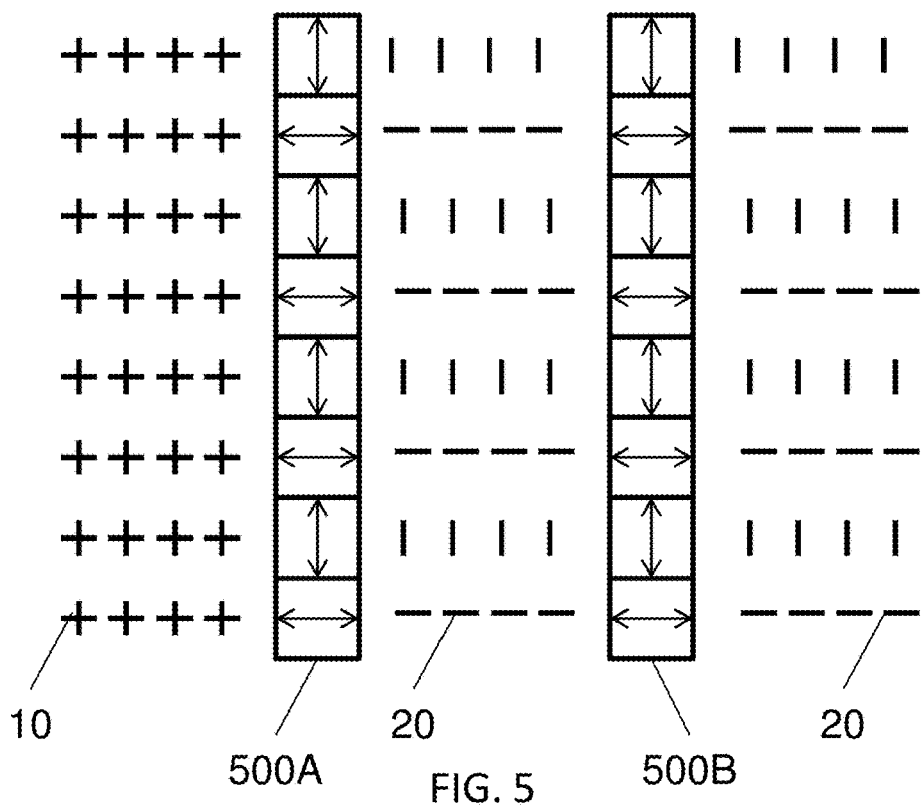
FIG. 5 illustrates the orientation of first and second patterned polarizers of a variable transmission window in a bright state, according to various embodiments of the present disclosure.
Figure 6:
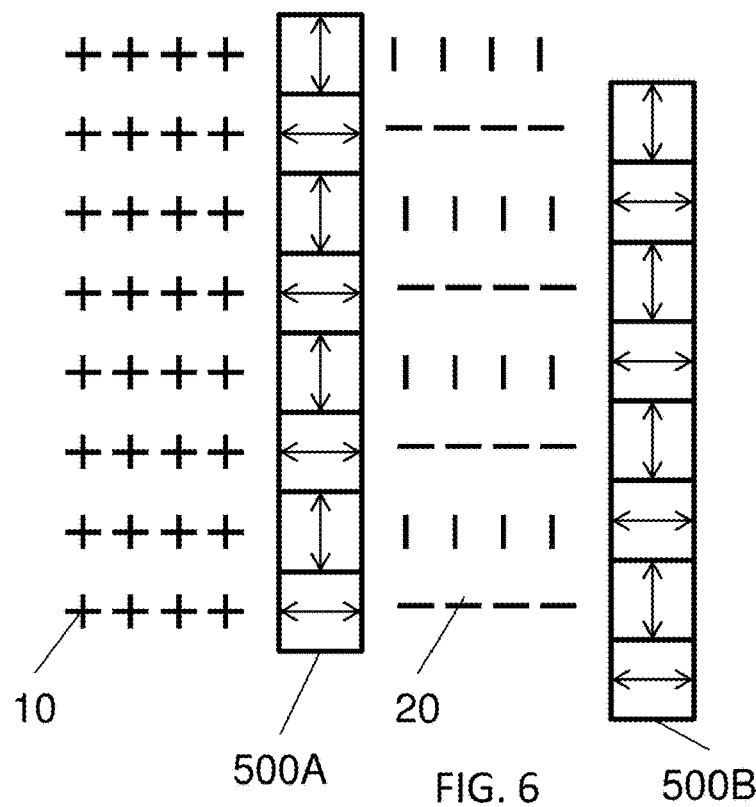
FIG. 6 illustrates the first and second patterned polarizers of FIG. 5 arranged in a dark state.

FIG. 5 illustrates the orientation of first and second patterned polarizers 500A, 500B of a variable transmission window in a bright state, according to various embodiments of the present disclosure. FIG. 6 illustrates the first and second patterned polarizers 400A, 400B arranged in a dark state, by translating one of the polarizers with respect to the other. One or both of the polarizers 500A, 500B may be a patterned polarizer that includes blackout bars, as described above.

Referring to FIG. 5, in the bright state, the polarizers 500A, 500B are aligned such that domains of the first polarizer 500A face domains of the second polarizer 500B that respectively have the same polarization axes. Unpolarized light 10 transmitted to the first polarizer 500A is converted into polarized light 20 having two different polarization directions, corresponding to the polarization directions of the corresponding domains of the polarizer 500A. The polarized light 20 is then transmitted through the polarizer 500B substantially unchanged, due to the alignment of the polarizers 500A, 500B. Accordingly, in the bright state, light transmission through the window is maximized.

Referring to FIG. 6, in the dark state, the relative position of the polarizers 500A, 500B is changed, such that domains of the polarizer 500A face domains of the polarizer 500B that respectively have perpendicular polarization axes. Unpolarized light 10 incident to the polarizer 500A is converted into polarized light 20 having two different polarization directions, corresponding to the polarization directions of the domains of the polarizer 500A. Due to the shifted alignment of the polarizers 500A, 500B, substantially all of the polarized light 20 is absorbed by the polarizer 500B. Accordingly, in the dark state, light transmission through the window is minimized.

Linear translation of the patterned polarizers or wave retarders discussed above may be accomplished in various ways. Because the relative position determines the transmittance, one or both patterned polarizers or wave plates may be moved. In alternate embodiments, the patterned polarizers or wave retarders may be affixed to a sliding mechanism, such as along rails to guide the patterned polarizers or wave retarders relative to one another. Various other mechanical devices may be used to translate the patterned polarizers or wave retarders.

In some embodiments, translation of the patterned polarizers or wave retarders may be electronically controlled, such as either being controlled automatically by a computer or various logic circuits or manually by instructions from a user (e.g., a user flipping a dimming switch).

Figure 7A:
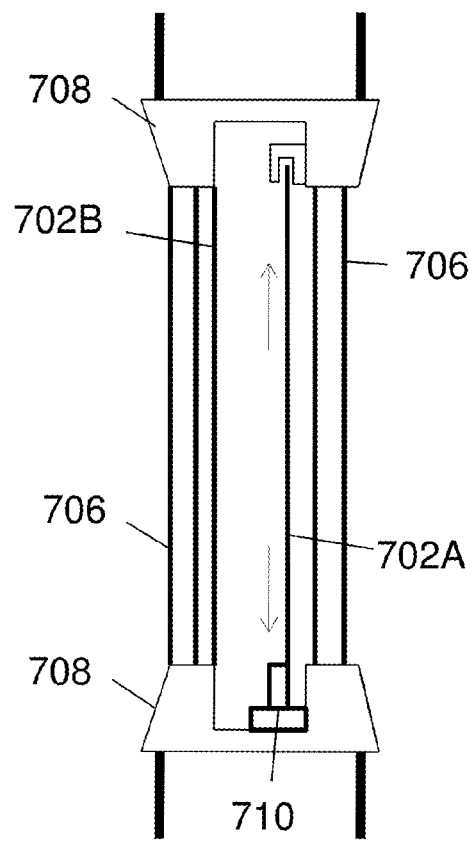
FIG. 7A illustrates a variable light transmission window, according to various embodiments of the present disclosure.

FIG. 7A illustrates a variable light transmission window with such a mechanical device, according to various embodiments of the present disclosure. Panes 706 of glass or another transparent material may be fixed within a frame 708 in a wall or other surface. Between panes 706, first and second patterned polarizers 702A and 702B may be placed facing one another. At least one of the polarizers 702A, 702B includes blackout bars, as described above. In some embodiments, the polarizers 702A, 702B may be patterned wave retarders. In this case, the window may also include polarizers disposed on the plates 706.

In FIG. 7A, the first polarizer 702B is fixed to the frame 708 while the other polarizer 702A is coupled with a mechanism 710 at one end. The other end of the second wave plate 702a may be movably supported by frame 708. Mechanism 710 may include various devices for linear shifting the polarizer or first wave plate 702A relative to the second polarizer 702B. For example, mechanism 710 may include any of various motorized, electromechanical, magnetic, or piezoelectric devices or any other device that can convert an electric signal to a linear translation.

In alternate embodiments, the patterned polarizers or wave retarders may be rolled around a rotating support at an edge to move the patterned polarizers or wave retarders up or down. These polarizers may be rolled up or down to linearly translate.

Figure 7B:
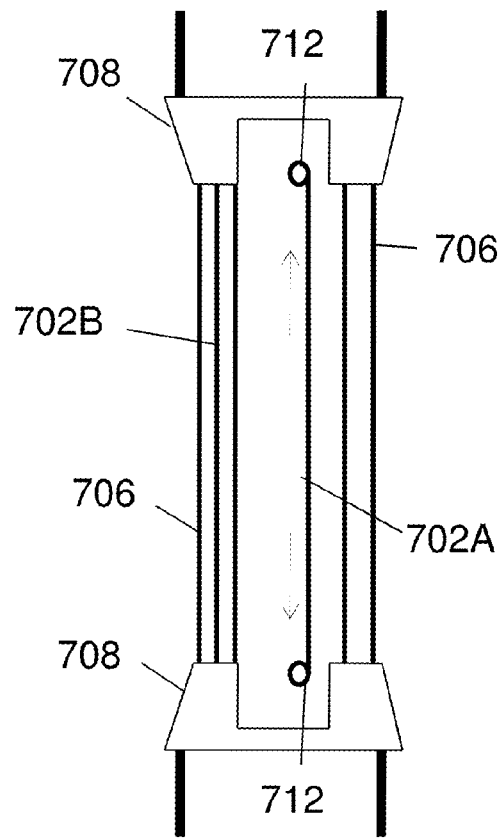
FIG. 7B illustrates a variable light transmission window with such a rotating support, according to various embodiments of the present disclosure.

FIG. 7B illustrates a variable light transmission window with such a rotating support, according to various embodiments of the present disclosure. Panes 706 of glass or another transparent material may be fixed within a frame 708 in a wall or other surface. Between the panes 706, first and second patterned polarizers 702A, 702B may also disposed. The second polarizer 702B may be fixed to the frame 708, while the first polarizer 702A is coupled at each end with rotating supports 712. These rotating supports 712 may spool the flexible first polarizer 702A up or down relative to the second polarizer 702B. The rotating supports 712 may be turned manually, (e.g., a user turning a knob) or automatically, as described with regard to FIG. 7A.

Figure 7C:
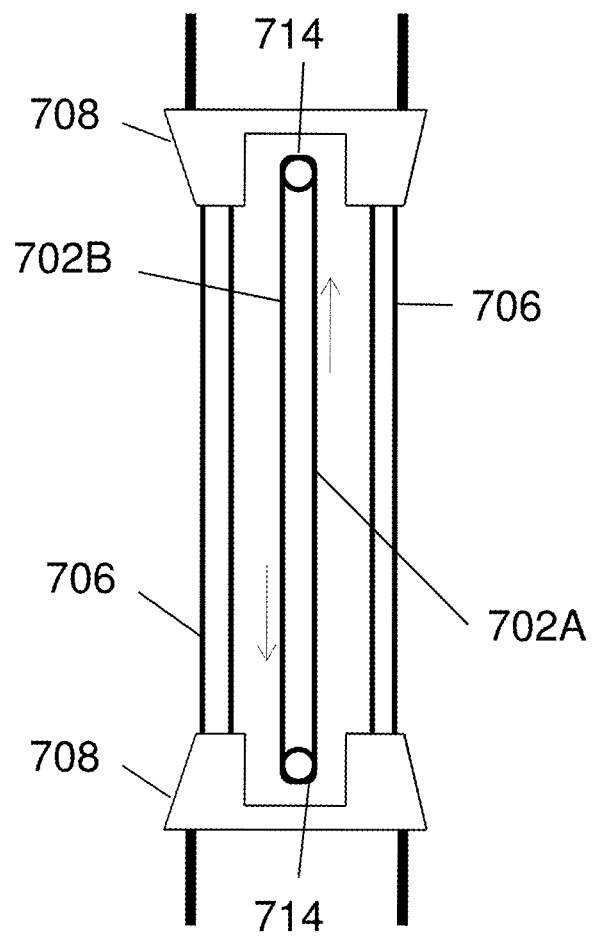
FIG. 7C illustrates a variable light transmission window with such a rotating support, according to various embodiments of the present disclosure.

FIG. 7C shows an alternate embodiment in which both polarizers 702A and 702B are simultaneously moved by rotating devices 714. The polarizers 702A and 702B may be part of one continuous wave plate film or web which is mounted around the rotating spools or reels 714. These rotating devices 714 may also be rotated manually or automatically as described above.

Patterned Polarizer Production Methods

Figure 8:
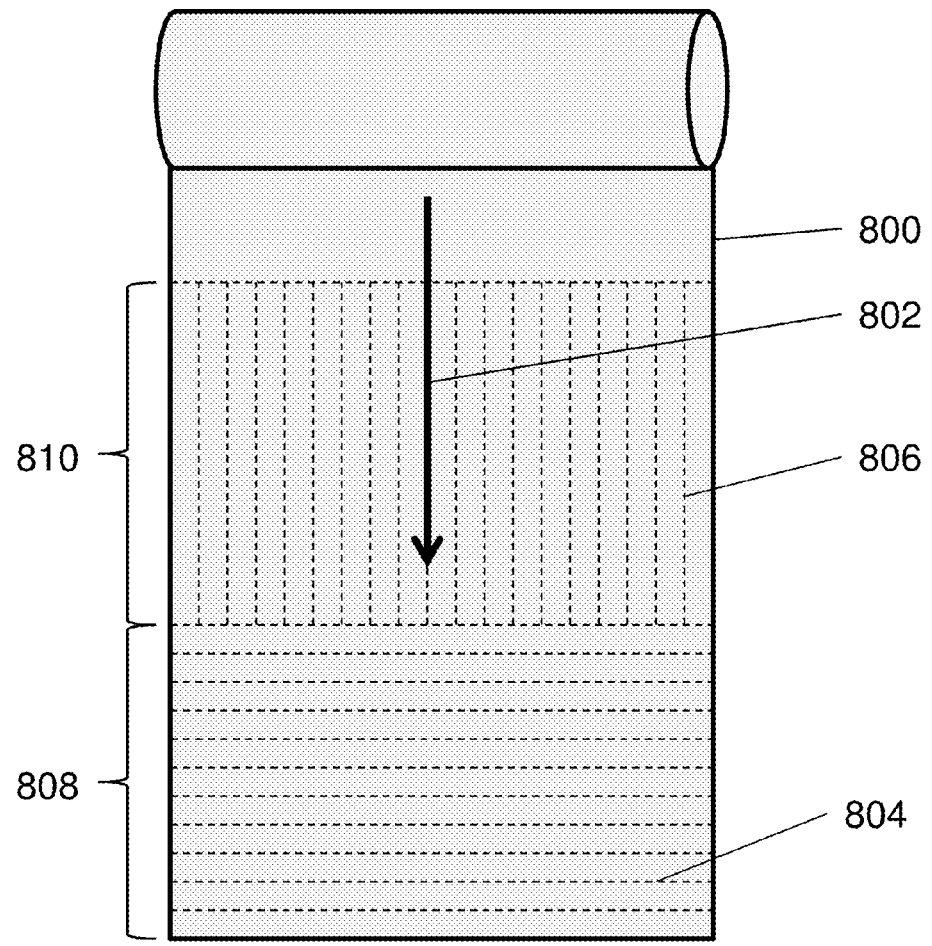
FIG. 8 depicts a method of cutting polarizer strips from a roll of polarizer film, according to various embodiments of the present disclosure.

FIG. 8 depicts a method of cutting polarizer strips from a roll of polarizer film, according to various embodiments of the present disclosure. Referring to FIG. 8, a polarizer film 800 may be unrolled onto a cutting surface. The film 800 may have a single polarization axis. For example, the film 800 may have a polarization axis in a direction as indicated by arrow 802. However, the present disclosure is not limited to any particular polarization axis direction.

The film 800 may be cut so as to generate first and second polarizer strips having perpendicular polarization axes. For example, as the film 800 is unrolled, a portion of the film 800 may be cut in a first direction, such as a widthwise direction shown by dashed lines 804, in order to produce the first polarizer strips 808. Another portion of the film 800 may then be cut in a second direction orthogonal to the first direction, such as a lengthwise direction shown by dashed lines 806, in order to produce the second polarizer strips 810.

However, the present disclosure is not limited to any particular first and second directions, so long as the resulting strips have perpendicular polarization axes. For example, the film 800 may be cut at a 45° angle, and the resulting in strips that have a 45° polarization axis. The strips may then be arranged such that adjacent strips have polarization axes of 45° and −45°, by controlling the orientation of the strips. In other words, since light passing through the strips in either direction is polarized, half of the strips may be used as first strips, and the other half may be inverted and used as second strips, since inverting the strips results in a 90° change in the polarization axes thereof, with respect to a particular viewing direction.

The first and second strips 808, 810 may then be alternately attached to a substrate, to produce a patterned polarizer having alternating domains with perpendicular polarization axes.

In some embodiments, blackout bars may be attached to opposing edge regions of adjacent first and second strips, such that the blackout bars overlap the corresponding gaps. For example, the blackout bars may be formed by attaching polymer strips to opposing edge regions of adjacent first and second strips. In other embodiments, blackout bars may be applied to the substrate before the first and second strips are attached to the substrate, such that the blackout bars overlap gaps between adjacent first and second strips. For example, the blackout bars may be formed by printing a light absorbing ink on the substrate.

Accordingly, various embodiments provide variable transmission windows that include a patterned polarizer configured to prevent light leakage through gaps between polarizer strips, such that a dark state of the window is not compromised by light leakage. Further, the use of blackout bars allows the gaps to be wide enough to compensate for the thermal expansion of the polarizer strips, thereby preventing delamination of the strips. The patterned polarizer is also configured to reduce transmittance variations resulting from off angle viewing parallax. Further, the patterned polarizer may be formed from strips of a polarizer sheet, thereby reducing the cost there of, as compared to a rubbed polarizer.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A variable transmission window, comprising:
a patterned first polarizer comprising:
an optically transmissive first substrate;
alternating first and second domains attached to the first substrate, the first domains having a polarization axis that is perpendicular to a polarization axis of the second domains; and
blackout bars configured to block visible light, each blackout bar overlapping opposing edge regions of adjacent corresponding first and second domains; and
a patterned second polarizer facing the first polarizer and comprising:
an optically transmissive second substrate; and
alternating third and fourth domains attached to the second substrate, the third domains having a polarization axis that is perpendicular to a polarization axis of the fourth domains;
wherein:
the first and the second domains respectively comprise first and second strips of a polarizer film, the first and second strips having substantially equal width;
the first and second strips are separated by gaps; and
the blackout bars overlap the gaps and prevent light leakage through the gaps.

2. The window of claim 1, wherein the blackout bars are disposed between the first substrate and the first and second domains.

3. The window of claim 2, wherein the blackout bars are printed on the first substrate.

4. The window of claim 1, wherein the first and second domains are disposed between the blackout bars and the first substrate.

5. The window of claim 4, wherein the blackout bars comprise polymer films disposed on the edge regions of the adjacent first and second domains.

6. The window of claim 1, wherein the second polarizer further comprises blackout bars configured to block visible light, each blackout bar overlapping opposing edge regions of adjacent corresponding third and fourth domains.

7. The window of claim 1, wherein the first and the second strips have respective polarization axes of +45° and −45°, or 0° and 90°, with respect to a direction parallel to a plane of the first substrate.

8. The window of claim 1, wherein the window transitions between a clear state and a dark state by moving at least one of the first and second substrates relative to the other one of the first and second substrates.

* * * * *